May 9, 1933.  G. CURRIE  1,907,509
CHAIN GUIDE
Filed April 11, 1929
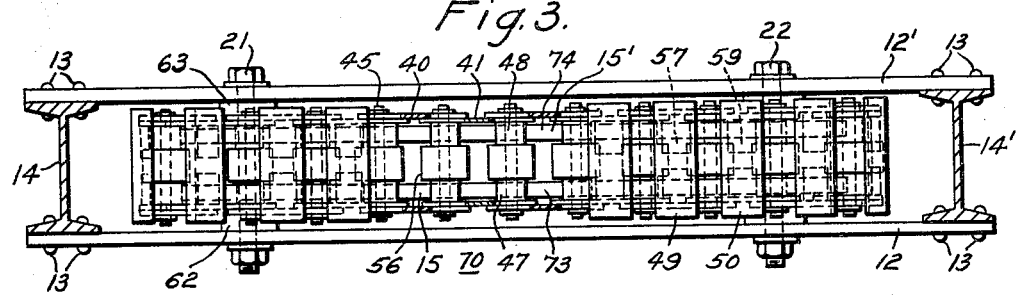
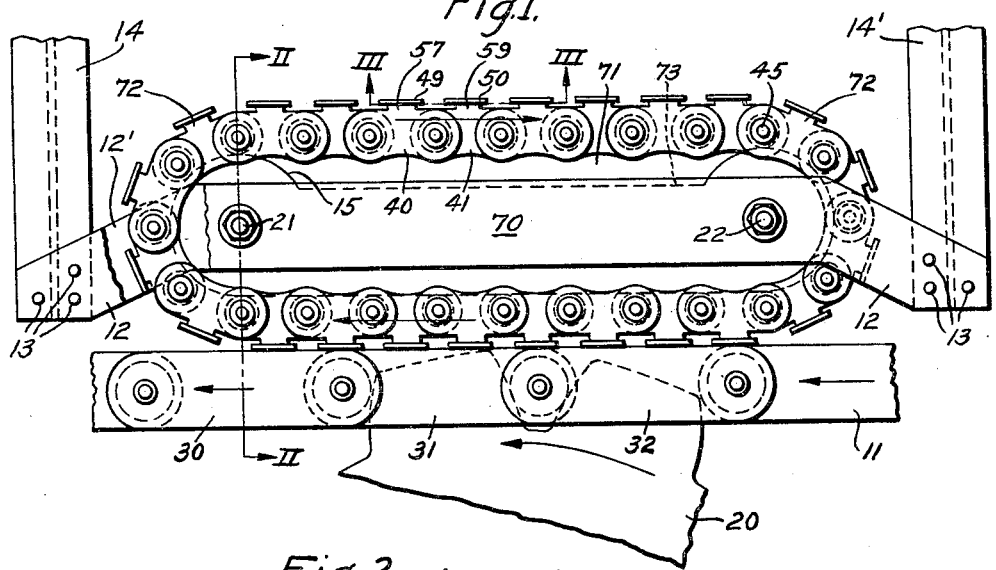
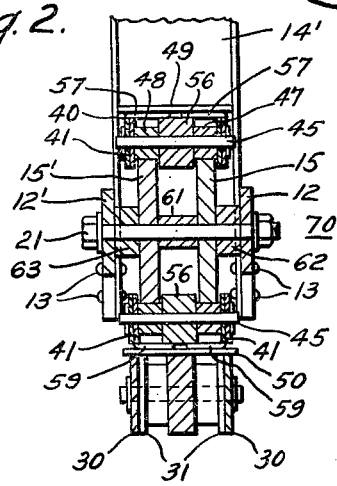
INVENTOR
Gilbert Currie.
BY
ATTORNEY Patented May 9, 1933

1,907,509

UNITED STATES PATENT OFFICE

GILBERT CURRIE, OF WILKINSBURG, PENNSYLVANIA, ASSIGNOR TO WESTINGHOUSE ELECTRIC & MANUFACTURING COMPANY, A CORPORATION OF PENNSYLVANIA

CHAIN GUIDE

Application filed April 11, 1929. Serial No. 354,277.

My invention relates to chain-guiding devices and particularly to chain-guiding devices for maintaining a power-transmitting chain in associated relation with its driving gear, and more particularly to chain-guiding devices for maintaining a chain in alignment at the place of its association with a driving gear.

In order to so retain a chain in mesh with a driving gear as to ensure a maximum efficiency of power transmission, as well as to maintain a minimum of mechanical wear on the driving gear, it has been proposed to use various kinds of chain-guiding devices.

One form of guiding device heretofore used consisted merely of a metallic strap or bar so supported that a plane surface held the chain in mesh with the gear and allowed the chain to slide past the guiding device, which held the chain more or less nearly in alignment. This device had the disadvantage of frictional wear on the plane surface which is, of course, objectionable from the standpoint of lost power as well as upkeep and maintenance of the guide.

Another form of guiding device proposed and used comprised a series of rollers. This device was superior to the above-mentioned sliding guide in that the objectionable feature of lost power and wear due to friction was eliminated. However, the disadvantage of this type of guide is that it is not capable of maintaining the individual links of the chain in proper alignment at the place of association with the driving gear. That is, this type of guide allows the chain to kink.

My invention comprises a guiding device which maintains the individual links of a chain in alignment at the place of association with a driving gear and, at the same time, exerts a negligible retarding force on the chain which it guides. The details of my invention are shown in the accompanying drawing, in which, Figure 1 is a side view, in detail, showing the guide which comprises my invention holding a chain in mesh with a driving gear.

Fig. 2 is a cross sectional view taken on line II—II of Fig. 1.

Fig. 3 is a plan view of the structure shown in Fig. 1, a portion being broken away between the points III—III.

In Fig. 1 is shown a driving gear wheel 20 in mesh with a chain 11 which it drives and a guiding means 70 which I employ for retaining the chain 11 in mesh with the driving gear wheel 20.

It will be observed that the guiding means 70 is held rigidly against the chain 11 by means of supporting members 14 and 14'.

The chain-guiding means 70 comprises essentially an endless chain 72 moving on pathways 15 and 15', shown in Fig. 2. The pathways 15 and 15' may be made of any material sufficiently hard to withstand the service to which they will be subjected but I prefer to employ hardened steel for this purpose.

The endless chain 72 may be of any standard type and I do not intend my invention to be limited to the particular type shown.

As I have shown it, endless chain 72 comprises a series of links 40 and 41 and two rollers 47 and 48 separated by interposed washers and spacers 56 held between the inside surface of links 41. The roller surfaces 47 and 48 move on pathways 15 and 15', respectively. The individual links 40 and 41 of the endless chain have transverse plane surfaces or plates 49 and 50, respectively, preferably of the same material as the links themselves, welded or screwed to the bent over portions 57 (of links 40), and 59 (of the links 41).

The plane surfaces or plates, when in alignment on the straight side of the pathways 15 and 15' maintain individual links 30, 31 and 32 of the chain 11 in alignment.

The pathways 15 and 15' of the guide itself are maintained in a proper spaced relation with each other between side members 12 and 12', by separating members, washers or spacers 61, 62 and 63 shown in Fig. 2, and bolts 21 and 22. Bolts or rivets 13 fasten the side members 12 and 12' of the chain guide 70 to the supporting members 14 and 14'.

The pathways may be of any number depending on the width of the endless chain 72 on the chain guide, which, in turn, depends upon the width of the chain 11 to be guided. I have shown two pathways 15 and 15' but I do not wish it to be understood that I have limited my invention to this number. A sufficient number of pathways must be used to maintain a firm and stable bearing surface of sufficient mechanical strength to withstand the radial force exerted by the gear wheel in engaging the chain which it drives.

It will be apparent that, while the one side of the pathways, that is, the side adjacent to the chain being held in mesh with the driving gear, must be straight the other or return side need not necessarily be so. The preferred construction of the pathways is as I have shown it in Fig. 1. This construction allows the endless chain 72 to move laterally into space 71 between itself and edges 73 and 74 of pathways 15 and 15', respectively, in order to take up any slack in the endless chain 72 which may occur.

The operation of this guiding device is exceedingly simple. It will be seen that the rotation of the gear wheel 20 in a counter-clock-wise direction, as shown by the arrow in Fig. 1, will move the chain 11 to the left, as shown by the arrows. Since the chain 11 is firmly held against the transverse plane surfaces of the endless chain on the guiding device by the radial force exerted by the driving gear wheel 20 any movement of the chain 11 will, necessarily by friction cause the endless chain to move in the same direction, without any other external moving means being necessary.

Since the endless chain of the guide moves around a hardened-steel pathway on rollers of hardened steel, it may be seen clearly that, with proper lubrication of the rollers on the pathways, there will be negligible friction as the endless chain moves around the pathways. This will, of course, result in substantially no friction retarding the movement of the chain 11.

It will thus be seen that my invention constitutes a means for retaining a chain in mesh with a driving gear, and for maintaining at the same time, an alignment of the individual links of the driven chain and exercising no retarding force to the movement of the driven chain.

It is to be understood that my invention is not confined to the exact construction and arrangement of parts which I have described, since other constructions and arrangements may be used which are not essentially different in principle.

I claim as my invention:

1. In a chain guide, means for maintaining a chain in a fixed mesh relation with a driving gear wheel and, at the same time, also maintaining an alignment of the individual links in the chain, said means comprising an endless chain for engaging a driven chain, and a rigid pathway on which said endless chain moves.

2. In a chain guide, means for maintaining a chain in a fixed mesh relation with a driving gear wheel and, at the same time, also maintaining an alignment of the individual links in the chain, said means comprising an endless chain for engaging a driven chain, a rigid pathway around which said endless chain moves, and means on said endless chain for engaging said pathway with substantially no friction.

3. In a chain guide, means for maintaining a chain in a fixed mesh relation with a driving gear wheel and, at the same time, also maintaining an alignment of the individual links in the chain, said means comprising an endless chain and a rigid pathway on which said endless chain moves, said endless chain moving on said pathway by engagement with a driven chain and with substantially no friction, whereby it exerts substantially no force retarding the motion of the said aligned chain.

4. In a chain guide, means for maintaining a chain in a fixed mesh relation with a driving gear wheel and, at the same time, also maintaining an alignment of the individual links in the chain, said means comprising an endless chain, a pathway on which said endless chain moves and supporting means effecting the cooperation of said endless chain and said pathway.

5. In a chain guide, means for maintaining a chain in a fixed associated relation with a driving gear wheel and, at the same time, also maintaining an alignment of the individual links in the chain, said means comprising an endless chain and a pathway on which said endless chain moves, said endless chain having transverse plane surfaces on the external side of its individual links for engaging a driven chain.

6. In a chain guide, means for maintaining a chain in a fixed associated relation with a driving gear wheel and, at the same time, also maintaining an alignment of the individual links in the chain, said means comprising an endless chain, a rigid endless pathway on which said endless chain moves comprising two straight sides and substantially rounded ends, said endless chain having, on the sides of individual links external to said pathway, transverse plane surfaces, said transverse plane surfaces forming a rigid and substantially plane surface when in alignment on a straight side of the said pathway, whereby the links of said driven chain are maintained in alignment while associated with the driving gear.

7. In a chain guide, means for maintaining a chain in a fixed associated relation with a driving gear wheel and, at the same time, also maintaining an alignment of the individual links in the chain, said means comprising an endless chain and a pathway on which said endless chain moves consisting of two straight sides and substantially rounded ends, said endless chain having, on the sides of each individual link external to said pathway, transverse plane surfaces, said transverse plane surfaces forming a substantially plane surface when in alignment on a straight side of the said endless chain pathway, whereby the links of said driven chain are maintained in alignment while associated with the driving gear wheel.

8. In a chain guide, means for maintaining a chain in a fixed associated relation with a driving gear wheel and, at the same time, also maintaining an alignment of the individual links in the chain, said means comprising an endless chain and a pathway on which said endless chain moves consisting of two straight sides and substantially rounded ends, said endless chain having, on the sides of individual links external to said pathway, transverse plane surfaces, said transverse plane surfaces forming a substantially plane surface when in alignment on a straight side of the said endless chain pathway, whereby the links of said driven chain are maintained in alignment while associated with the driving gear wheel, said endless chain and said pathway having means supporting them and permitting their cooperation.

9. In a chain guide, means for maintaining a chain in a fixed associated relation with a driving gear wheel and, at the same time, also maintaining an alignment of the individual links in the chain, said means comprising an endless chain and a pathway on which said endless chain moves consisting of two straight sides and substantially rounded ends, said endless chain having, on the sides of individual links external to said pathway, transverse plane surfaces, said transverse plane surfaces forming a substantially plane surface when in alignment on a straight side of the said endless chain pathway, whereby the links of said driven chain are maintained in alignment while associated with the driving gear, means for supporting and effecting the cooperation of said endless chain and said pathway, and means for supporting the entire guiding means in proper association with the driving chain.

10. In a chain guide, means for maintaining a driven chain in fixed mesh relation with a driving gear wheel and, at the same time, for also maintaining a linear alignment of a plurality of the individual links of the driven chain at the point of contact with the gear wheel, said means including movable means disposed to frictionally engage the driven chain opposite the gear wheel and move by movement of the driven chain.

11. In a chain guide, means for maintaining a driven chain in fixed mesh relation with a driving gear wheel and, at the same time, for also maintaining an alignment of the links of the driven chain, said means including movable means provided with anti-friction means, a stationary member for defining a rigid path on which said movable means moves with substantially no friction, and means for supporting said movable means in frictional engagement with said driven chain to cause said movable means to be moved by movement of the driven chain.

12. In a chain guide, means for maintaining a driven chain in fixed mesh relation with a driving gear wheel and at the same time, for also maintaining an alignment of the links of the driven chain, said means including an endless chain, means for defining an endless path of movement for said endless chain, said path having a straight portion, said defining means including a rigid stationary member for resisting flexure of the straight portion of said endless chain, and means for supporting said endless chain with the straight portion thereof in frictional engagement with said driven chain opposite the driving gear wheel, the endless chain being moved by movement of the driven chain.

13. In a chain guide, means for maintaining a driven chain in fixed mesh relation with a driving gear wheel, said means comprising an endless chain, means defining an endless path of movement for said endless chain, supporting means for causing said endless chain to frictionally engage the driven chain and be moved by movement of the latter, and anti-friction means for causing said endless chain to move with negligible friction whereby the movement of said endless chain is effected with substantially no force exerted to retard the motion of the driven chain.

14. In combination, a driving gear wheel, a chain comprising a plurality of links and driven by said gear wheel, guiding means for maintaining said driven chain in mesh relation with said driving gear wheel and, at the same time, for maintaining the links of said chain in alignment, said guiding means comprising an endless chain, means for defining an endless path of movement for said endless chain, and means for supporting said endless chain in frictional engagement with said driven chain to cause the endless chain to be moved by movement of said driven chain.

15. In combination, a driving gear wheel, a chain comprising a plurality of links and driven by said gear wheel, guiding means for maintaining said driven chain in mesh relation with said driving gear wheel and, at the same time, for maintaining the links of said chain in alignment, said guiding means comprising an endless chain, means for defining an endless path of movement for said endless chain, said path including a straight portion, said defining means including a rigid stationary member for resisting flexure of the straight portion of said endless chain, and means for supporting said endless chain with the straight portion thereof in frictional engagement with said driven chain opposite said driving gear wheel, said endless chain being moved by movement of the driven chain.

16. In combination, a driving gear wheel, a chain comprising a plurality of links and driven by said gear wheel, guiding means for maintaining said driven chain in mesh relation with said driving gear wheel and, at the same time, for maintaining the links of said chain in alignment, said guiding means comprising an endless chain, means for defining an endless path of movement for said endless chain, said path including a straight portion, said defining means including a rigid stationary member for resisting flexure of the straight portion of said endless chain, means for supporting said endless chain with the straight portion thereof in frictional engagement with said driven chain opposite said driving gear wheel, said endless chain being moved by movement of said driven chain, and antifriction means on said endless chain for causing it to engage said rigid stationary member with substantially no friction whereby said endless chain exerts substantially no force retarding the movement of the driven chain.

17. In a chain guide, means for maintaining a chain and a sprocket wheel in fixed mesh relation while at the same time maintaining a linear alignment of a plurality of the individual links comprising the chain at the point of contact with the sprocket wheel, said means including endless chain means adapted to frictionally engage the first-mentioned chain and to be moved by movement thereof.

18. The combination with a power-transmitting device including a chain and a sprocket wheel in associated mesh relation, of means for maintaining the chain and sprocket wheel in fixed mesh relation while at the same time maintaining a linear alignment of a plurality of individual links comprising the chain at the point of contact with the sprocket wheel, said means including endless chain means adapted to frictionally engage the said chain and to be moved by movement thereof.

In testimony whereof, I have hereunto subscribed my name this 2nd day of April 1929.

GILBERT CURRIE.